(12) United States Patent
Padawer et al.

(10) Patent No.: US 11,756,117 B2
(45) Date of Patent: Sep. 12, 2023

(54) ELECTRONIC CERTIFICATION DATA STRUCTURES FOR VERIFYING RESOURCE INTEGRITY

(71) Applicant: Progrexion IP, Inc., Salt Lake City, UT (US)

(72) Inventors: Justin Randall Padawer, Salt Lake City, UT (US); Taylor Cushman Rose, South Jordan, UT (US); Michael Angelo DeVico, Park City, UT (US); Richard Edward Horne, Farmington, UT (US)

(73) Assignee: PROGREXION IP, INC., Wilmington, DE (US)

( * ) Notice: Subject to any disclaimer, the term of this patent is extended or adjusted under 35 U.S.C. 154(b) by 98 days.

(21) Appl. No.: 17/380,582

(22) Filed: Jul. 20, 2021

(65) Prior Publication Data

US 2023/0028704 A1    Jan. 26, 2023

(51) Int. Cl.
  *G06Q 40/03* (2023.01)
  *H04L 9/32* (2006.01)
  *H04L 9/08* (2006.01)
  *H04L 9/00* (2022.01)

(52) U.S. Cl.
  CPC .......... *G06Q 40/03* (2023.01); *H04L 9/0825* (2013.01); *H04L 9/3239* (2013.01); *H04L 9/3297* (2013.01); *G06Q 2220/00* (2013.01); *H04L 9/50* (2022.05)

(58) Field of Classification Search
  None
  See application file for complete search history.

(56) References Cited

U.S. PATENT DOCUMENTS

| | | | |
|---|---|---|---|
| 10,504,174 B2 * | 12/2019 | Loganathan | G06Q 40/025 |
| 2016/0203522 A1 * | 7/2016 | Shiffert | G06Q 30/0267 705/14.58 |
| 2018/0075527 A1 * | 3/2018 | Nagla | G06Q 40/025 |
| 2018/0227131 A1 * | 8/2018 | Ebrahimi | H04L 9/0643 |
| 2019/0020468 A1 * | 1/2019 | Rosenoer | H04L 9/3242 |
| 2019/0268147 A1 * | 8/2019 | Baird, III | G06F 16/27 |
| 2019/0333142 A1 * | 10/2019 | Thomas | G06F 16/27 |
| 2020/0244470 A1 * | 7/2020 | Ruckriemen | H04L 9/3236 |
| 2020/0258158 A1 * | 8/2020 | Gilliam | G06Q 10/10 |

(Continued)

OTHER PUBLICATIONS

"Stan Schroeder, I took out a loan with cryptocurrency and didn't sign an thing, Jan. 28, 2020." (Year: 2020).*

(Continued)

*Primary Examiner* — Kito R Robinson
*Assistant Examiner* — Toan Duc Bui
(74) *Attorney, Agent, or Firm* — Workman Nydegger

(57) ABSTRACT

Techniques for certifying a document and for securely transmitting access to the document across a blockchain network are disclosed. A document, which details results of a soft inquiry executed against a user's credit history, is accessed. A hash algorithm is applied to the document to certify it. The hash algorithm is based on a timestamp indicating when the document was created. Applying the hash algorithm also generates a portable identifier reflecting the document is certified at the time indicated by the timestamp. The portable identifier is added as a record to a blockchain. The record is transmitted to a second computer system using public and private keys.

20 Claims, 18 Drawing Sheets

(56) References Cited

U.S. PATENT DOCUMENTS

| | | | |
|---|---|---|---|
| 2021/0056620 A1* | 2/2021 | Tang | H04L 9/0637 |
| 2021/0119806 A1* | 4/2021 | He | G06F 16/22 |
| 2021/0152365 A1* | 5/2021 | Nosseir | H04L 9/3239 |
| 2021/0326785 A1* | 10/2021 | Mcburnett | G06F 21/6245 |
| 2022/0366494 A1* | 11/2022 | Celia | G06Q 40/04 |

OTHER PUBLICATIONS

"Jerome Kehrli, Blockchain explained, niceideas.ch, Oct. 7, 2016, 14-18" (Year: 2016).*

* cited by examiner

ELECTRONIC CERTIFICATION DATA STRUCTURES FOR VERIFYING RESOURCE INTEGRITY

BACKGROUND

There are a variety of ways in which borrowers are able to borrow funds or open new lines of credit from lenders. By way of example, borrowers can open new lines of credit by applying for loans, by applying for credit cards, and so on. Lines of credit are typically offered by financial institutions, such as banks and credit unions.

It is expected that borrowers will repay the funds that they borrow from lenders. It follows then, that lenders will desire to work only with borrowers that are creditworthy, meaning that the borrower has a reputation for repaying borrowed funds. If the borrower does not repay the funds, then the lender is adversely impacted and may lose money. It is desirable, therefore, for lenders to be able to accurately gauge the creditworthiness of potential borrowers. To do so, lenders traditionally perform inquiries into the borrower's credit history to learn how the borrower has behaved in the past. Past performance often reflects future behavior. If the borrower's past performance indicates a pattern of behavior showing that the borrower pays off his/her debts, then the lender is probably more likely going to be willing to open a new line of credit with the borrower. The contrary is also true.

Unfortunately, it is often the case that inquiries into a borrower's credit history adversely impacts the borrower's ability to open a new line of credit. For example, when a borrower shops around, multiple lenders may submit inquiries into the borrower's credit history. These inquiries are reflected in the borrower's credit history. A large number of inquiries can detract potential lenders because the inquiries may reflect negatively on the borrower (e.g., perhaps the borrower is in high need for funds and may not be trustworthy). What is needed, therefore, is an improved methodology and technique for enabling borrowers and lenders to work together without adversely impacting the borrower's credit history.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for certifying a document and for securely transmitting access to the document across a blockchain network.

In some embodiments, a document is initially accessed. The document details results of a soft inquiry executed against a credit history of a user. Execution of the soft inquiry against the credit history results in a new tradeline being added to the credit history but does not modify a credit score of the user. A hash algorithm is applied to the document to certify the document. The hash algorithm is based, at least in part, on a timestamp indicating a time when the document was created. The process of applying the hash algorithm to the document generates a portable identifier that reflects the document is certified at the time indicated by the timestamp. The portable identifier is then added as a record to a blockchain. Consequently, the record is included in a public distributed ledger. The record is transmitted to a second computer system by identifying a first wallet address of a user account of the user and by identifying a second wallet address of a second user account of a second user of the second computer system. A private key of the user account is used to hash a package comprising the record, where the package is addressed to the second wallet address. Hashing the package results in the package being digitally signed. The package is then transmitted across a network of the blockchain using a public key of the second user account. The package is decryptable only by a private key of the second user account. When the package is decrypted by the private key of the second user account, the portable identifier is usable to access the certified document.

In some embodiments, a hard inquiry executed against the credit history of the user results in another new tradeline being added to the credit history and does modify the credit score of the user. Additionally, in some embodiments, after the package is transmitted across the network and after the package is decrypted, the embodiments trigger or detect execution of a hard inquiry against the credit history of the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
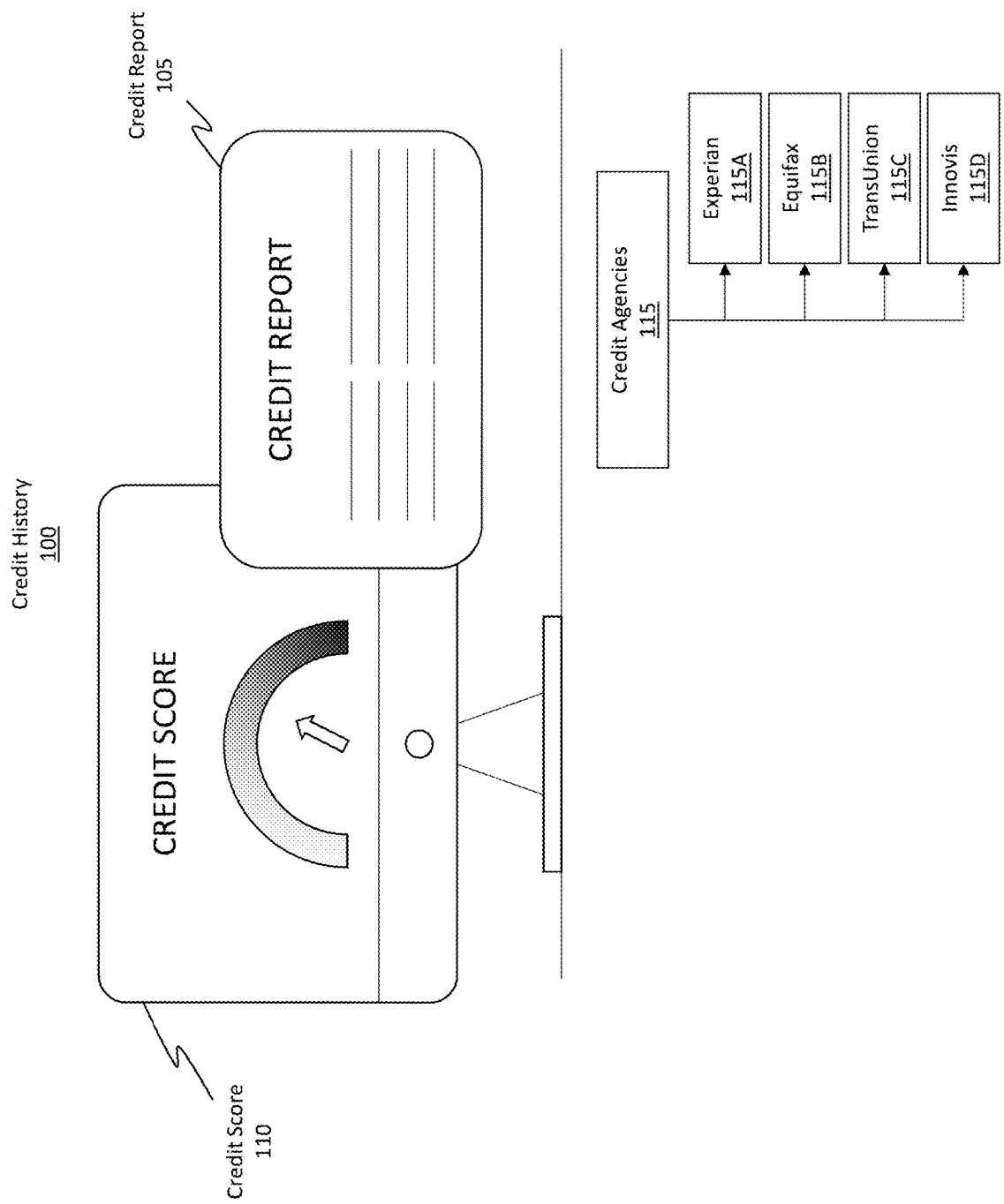
FIG. 1 illustrates various information regarding credit scores, credit reports, and credit agencies.

Embodiments disclosed herein relate to systems, devices, and methods for certifying a document and for securely transmitting access to the document across a blockchain network.

In some embodiments, a document, which details results of an inquiry (e.g., a hard or soft inquiry) executed against a user's credit history, is accessed. A soft inquiry results in a new tradeline being added to the user's credit history but does not modify the user's credit score. A hash algorithm is applied to the document to certify it. The hash algorithm is based on a timestamp indicating when the document was created. The hash algorithm generates a portable identifier reflecting the document is certified at the time indicated by the timestamp. The portable identifier is added as a record to a blockchain. The record is transmitted to a second computer system by identifying a first wallet address of the user's account and by identifying a second wallet address of a second user's account. A private key of the user account is used to hash a package comprising the record, where the package is addressed to the second wallet address. Hashing the package results in the package being digitally signed. The package is then transmitted across the blockchain network using the second user's public key. The package is decryptable only by a private key of the second user account. When the package is decrypted, the portable identifier can be used to access the certified document.

In some embodiments, a hard inquiry executed against the credit history of the user results in another new tradeline being added to the credit history and does modify the credit score of the user. Additionally, in some embodiments, after the package is transmitted across the network and after the package is decrypted, the embodiments trigger or detect execution of the hard inquiry against the credit history of the user.

The term "user" should be interpreted broadly and can include a "borrower" or a "lender." A "borrower" is a person or entity seeking to borrow funds. A "lender" or "creditor" is a person or entity that provides loaned funds.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial improvements to the technical field. By way of example, by following the disclosed principles, users of the systems are significantly benefitted because they will be able to reduce negative actions against their credit histories (e.g., by potentially reducing the number of inquiries executed against their credit histories). By reducing negative actions against their credit histories, users on both sides (e.g., creditors and borrowers) are both benefitted because a more accurate snapshot of the borrower's credit history will be made available.

Additional benefits are also achieved by following the disclosed principles. By way of example, the embodiments improve data integrity, data accuracy, and data trustworthiness via use of the blockchain and hashing processes. By storing information related to a person's credit history in the blockchain, that information is protected from potential misuse or malfeasance. As such, data integrity is improved by following the disclosed operations.

The embodiments also result in practical applications that improve the technology. For instance, when the disclosed principles are followed, the accuracy and certification of a document can be verified without modifying the document (e.g., without modifying the metadata or contents of the document). That is, actions can be performed to verify that the document is true and authentic without having to modify the underlying document itself. In this sense, a beneficial application in which the embodiments are applied results to document verification and integrity checking. Accordingly, these and numerous other benefits will be explained in more detail throughout the remaining sections of this disclosure.

Credit History

Attention will now be directed to FIG. 1, which provides details regarding a user's credit history 100. Generally, a credit history 100 refers to a historical record detailing a user's ability to pay or repay debts incurred by the user over time. In this regard, the credit history 100 generally demonstrates the user's efforts, responsibility, behaviors, and patterns in paying his/her debts.

A credit report 105 is a report that provides details regarding the user's credit history 100. A credit report 105 includes any number of tradelines, which is a line item in the credit report 105 and which details credit accounts opened by the user.

Figure 2:
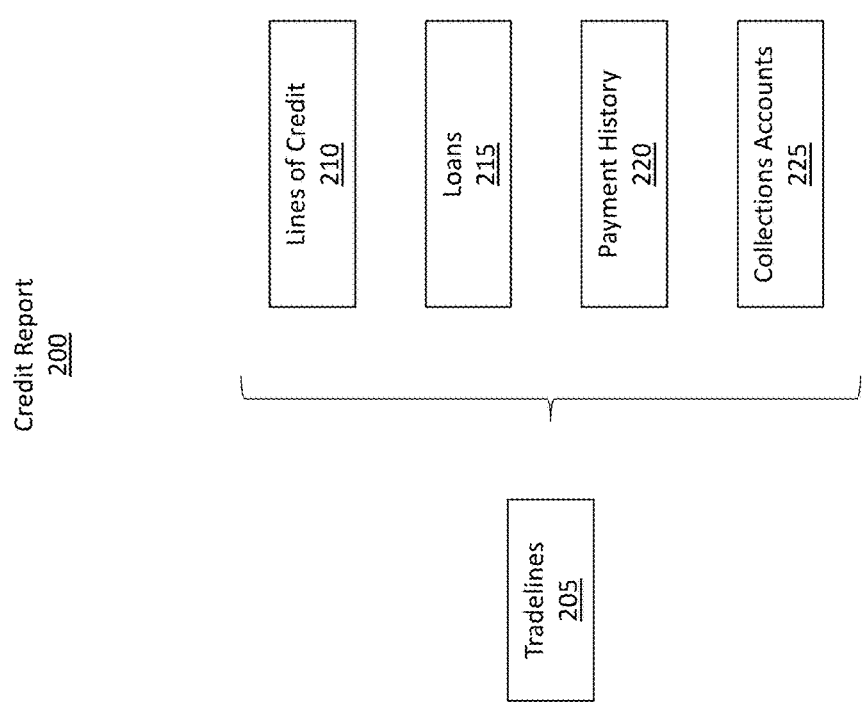
FIG. 2 illustrates how a credit report may include different types of tradelines.

Turning briefly to FIG. 2, a credit report 200 is shown, similar to the credit report 105 of FIG. 1. Here, the credit report 200 is shown as including tradelines 205. In this example, the tradelines 205 are shown as including numerous different types of information. Examples of tradelines 205 include, but are not limited to, lines of credit 210, loans 215, payment history 220, and collections accounts 225. These different tradelines may all be included in a user's credit report, which details the user's credit history.

Returning to FIG. 1, credit reports 105 often include a plethora of information. In an effort to provide a quick measurement or gauge regarding a user's credit history, a credit score 110 is often computed for the user. The credit score 110 is a three digit number, typically ranging anywhere between 300 and 900, that outlines and that summarizes a user's creditworthiness. Higher credit scores indicate higher creditworthiness while lower credit scores indicate lower creditworthiness.

Figure 3:
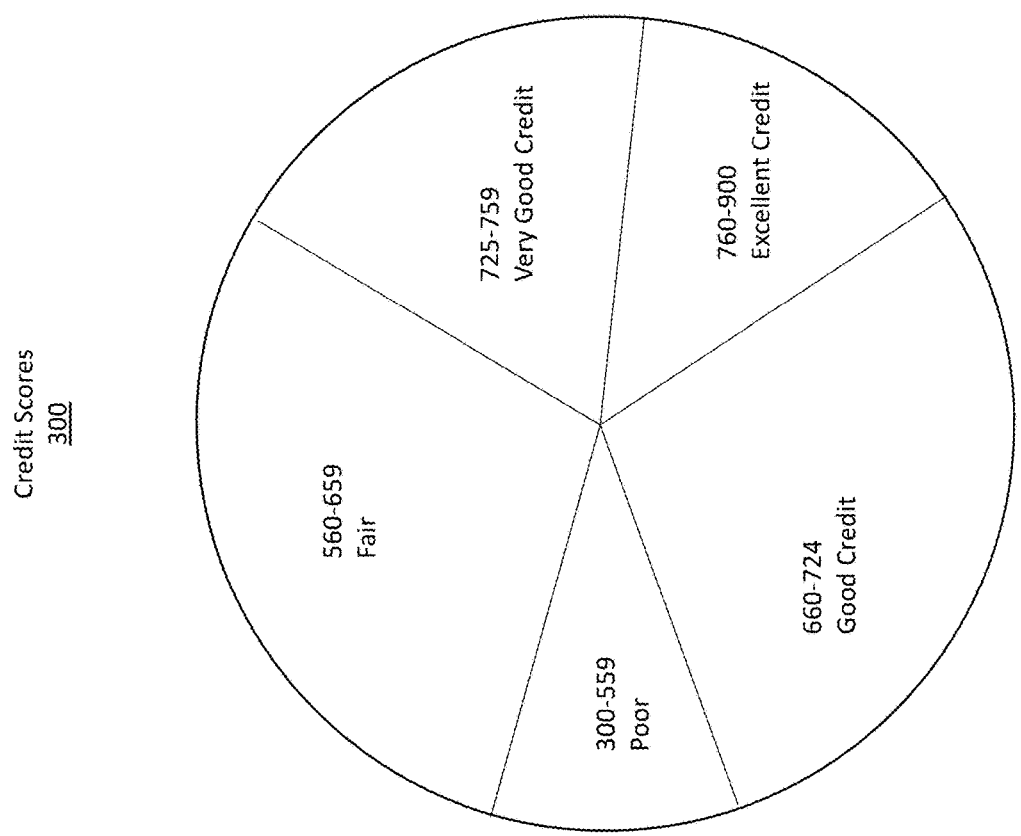
FIG. 3 illustrates various aspects related to a credit score.

Turning briefly to FIG. 3, various credit scores 300 are shown. Generally, the credit scores 300 are broken up into various categories, as reflected by the pie chart in FIG. 3. Scores ranging between 300-559 are generally considered to be "Poor." Scores ranging between 560-659 are generally considered to be "Fair." Scores ranging between 660-724 are considered to be "Good Credit." Scores ranging between 725-759 are considered to be "Very Good Credit." Scores ranging between 760-900 are considered to be "Excellent Credit." A person's credit score is a calculus based on the tradelines included in his/her credit report, or rather, in the credit history.

Returning to FIG. 1, there are multiple entities, or credit agencies 115, that monitor and record user's credit histories. Examples of these credit agencies 115 include Experian 115A, Equifax 115B, TransUnion 115C, and Innovis 115D. These credit agencies 115 collect and research the credit information for users and are able to provide that information to interested lenders.

Types of Inquiries

Figure 4:
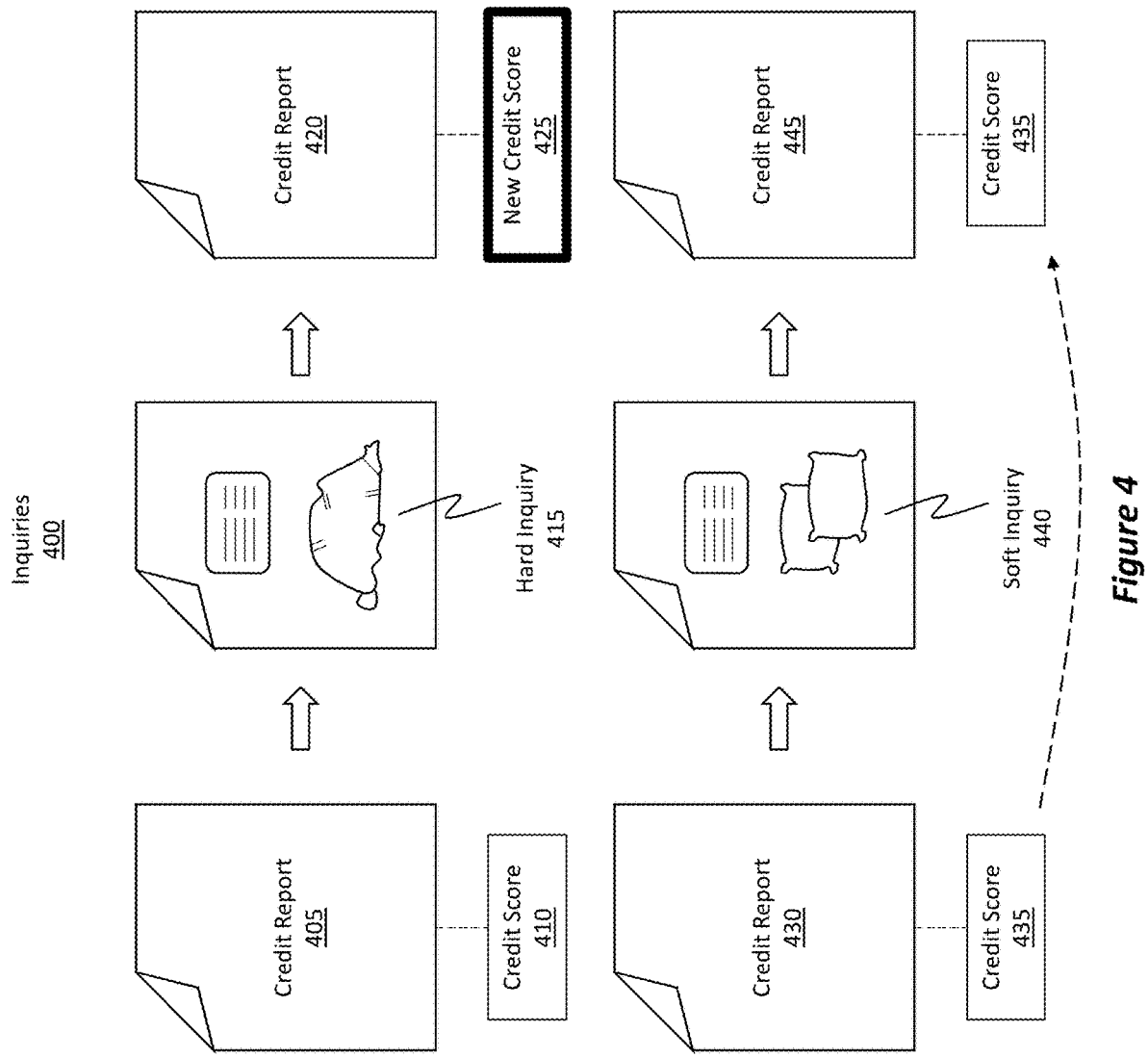
FIG. 4 illustrates different types of inquiries that can be executed against the credit history of a user.

Lenders of credit want to ensure that they are making a trustworthy investment with potential borrowers. In order to gauge or determine the trustworthiness of a potential borrower, a lender (or even the borrower him/herself) can execute an inquiry into an entity's credit history to learn of the various tradelines in that credit history. FIG. 4 shows different types of inquiries 400 that may be performed to obtain information regarding a credit history.

FIG. 4 initially shows a credit report 405 and an associated credit score 410 for an entity's credit history. One example inquiry is referred to as a hard inquiry 415. Generally, a hard inquiry 415 is a type of inquiry that occurs when a potential lender submits a request to review another entity's credit history and credit report. A hard inquiry 415 is typically performed during a loan application process. Hard inquiries do impact an entity's credit report. For example, as a result of performing the hard inquiry 415 against the credit report 405, the credit report 405 itself is modified in that a new tradeline is added to the credit report, thereby resulting in the credit report 420. Additionally, the hard inquiry 415 often results in a modification to the credit score 410, as shown by the new credit score 425.

It should be noted that multiple hard inquiries executed against an entity's credit report for the same type of loan (e.g., perhaps a mortgage) within a certain time period will often count as only a single hard inquiry. That is, it is beneficial for borrowers to shop around to find the best rates for borrowing money. By counting multiple hard inquiries as one (if performed within a designated time period), users will not be penalized for shopping around to find the best borrow rates. If, however, a user prolongs his/her research and has multiple hard inquiries executed over a prolonged period of time, then that user's credit history will likely be adversely impacted. That is, the user's credit score will repeatedly decline due to the multiple hard inquiries being performed. Accordingly, hard inquiries are recorded in a user's credit report and often result in a modification to the user's credit score (e.g., the score is lowered).

A "soft inquiry" on the other hand, does not impact the user's credit score. To illustrate, FIG. 4 shows a credit report 430 and a credit score 435 associated with a user's credit history. A soft inquiry 440 is executed. Although soft inquiries are included in a user's credit report (thereby resulting in a modified credit report, as shown by credit report 445), the credit score remains the same, as shown by credit score 435 also being associated with the credit report 445. That is, even though a new tradeline is added to a user's credit report, if the tradeline is for a soft inquiry, then that new tradeline will not result in a modification to the user's credit score.

By way of additional explanation, a soft inquiry often occurs when a user checks his/her own credit reports and/or when promotions for the user are generated (e.g., a promotional credit card or pre-approval). Hard inquiries, on the other hand, reflect a timeline as to when a user has applied for loans or new types of credit and can stay on a user's credit report for many months (e.g., 36 months). Recent or new hard inquiries generally indicate to lenders that a borrower is shopping around for new credit.

Figure 5:
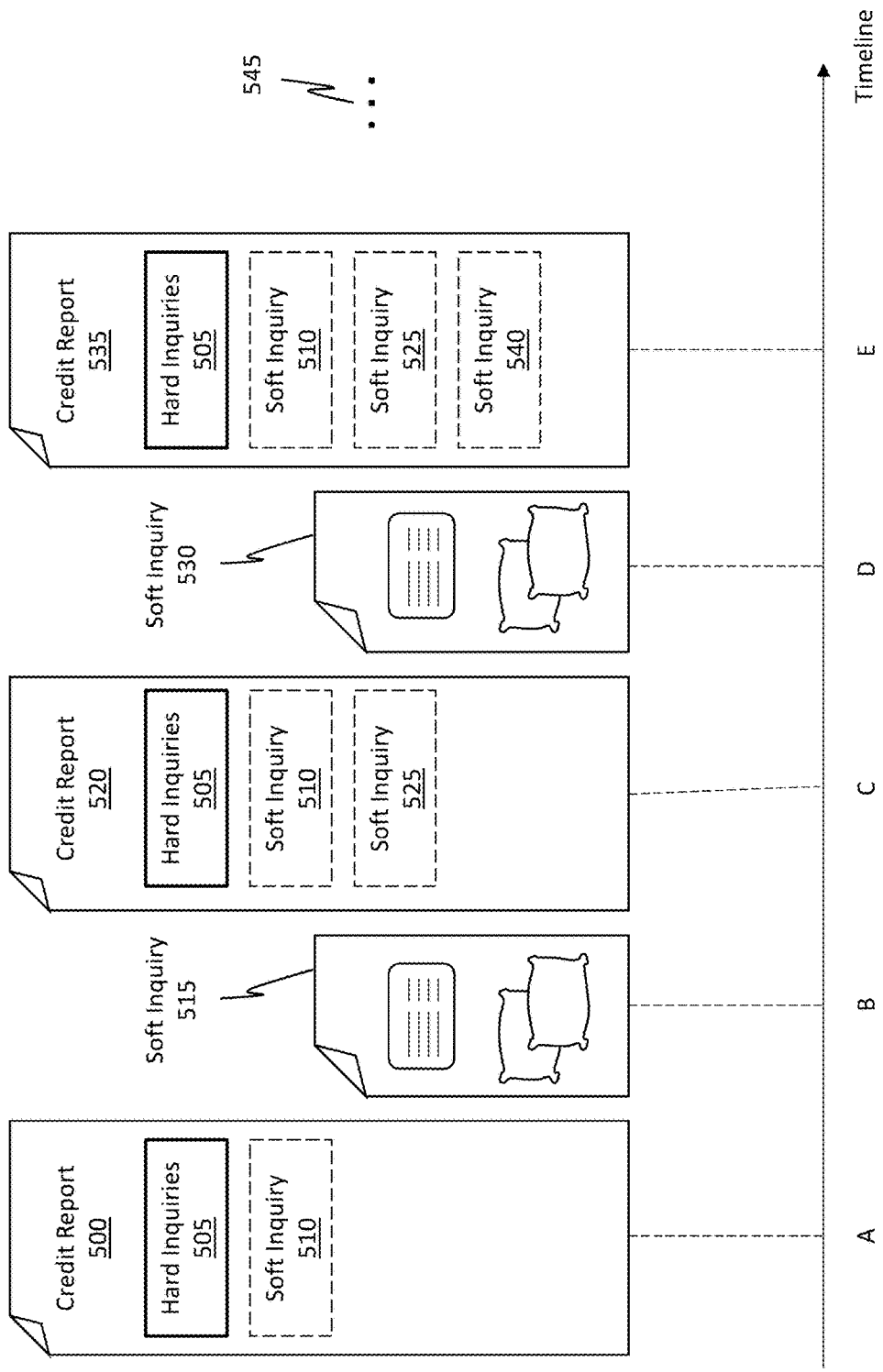
FIG. 5 illustrates how a credit report is modified based on the different types of credit inquiries.

FIG. 5 provides a useful time illustration showing how inquiries impact a credit report. Time "A" shows the state of a credit report 500, which includes tradelines comprising hard inquiries 505 and a soft inquiry 510, both of which were performed at a time prior to time "A." At time "B," a soft inquiry 515 is executed against the user's credit history. Time "C" shows the updated state of the user's credit history, which is now visualized via the credit report 520. This credit report 520 includes the previous hard inquiries 505 and the soft inquiry 510. Now, however, the credit report 520 includes a new tradeline in the form of soft inquiry 525, which is reflective of the soft inquiry 515. Although not shown, the credit score associated with this credit report is not modified as a result of the soft inquiry 515.

At time "D," another soft inquiry 530 is executed against the user's credit history. The credit report 535 is now generated and is an updated version of the credit report 520. For example, the credit report 535 includes the hard inquiries 505, the soft inquiry 510, and the soft inquiry 525. Additionally, the credit report 535 includes a new tradeline line in the form of soft inquiry 540, which is reflective of the soft inquiry 530. No change to the credit score occurs.

As new soft inquiries are executed, new tradelines are added to the credit report. Notably, however, these soft inquiry tradelines do not impact the user's credit score. The ellipsis 545 demonstrates how the state of the credit report can be updated each time a new soft inquiry and/or a new hard inquiry is executed against a user's credit history.

Certifying a Credit Report

Having just explained credit reports, scores, and inquiries, attention will now be directed to processes for certifying a credit report and for making that certification portable so as to prevent additional inquiries from being performed until such time as is needed in order to complete the opening of a new line of credit. That is, by following the disclosed operations, a user is able to certify his/her credit report and make that certification portable. When the user then proceeds to research and find potential lenders, instead of having those lenders each run their own respective inquiry (e.g., a hard inquiry) into the user's credit history, the lenders can rely on the certified version of the credit report. This certification can spur initiate or tentative negotiations between the borrower and the lender. Once the research is complete and negotiations have progressed sufficiently, then at that time a single lender can perform a single hard inquiry against the user's credit history to finalize the lender's determination as to whether to lend funds or not. Prior to that point in time, however, the certified version of the credit report can be used as a preliminary document for indicating the creditworthiness of the borrower. Accordingly, attention will now be directed to FIG. 6.

Figure 6:
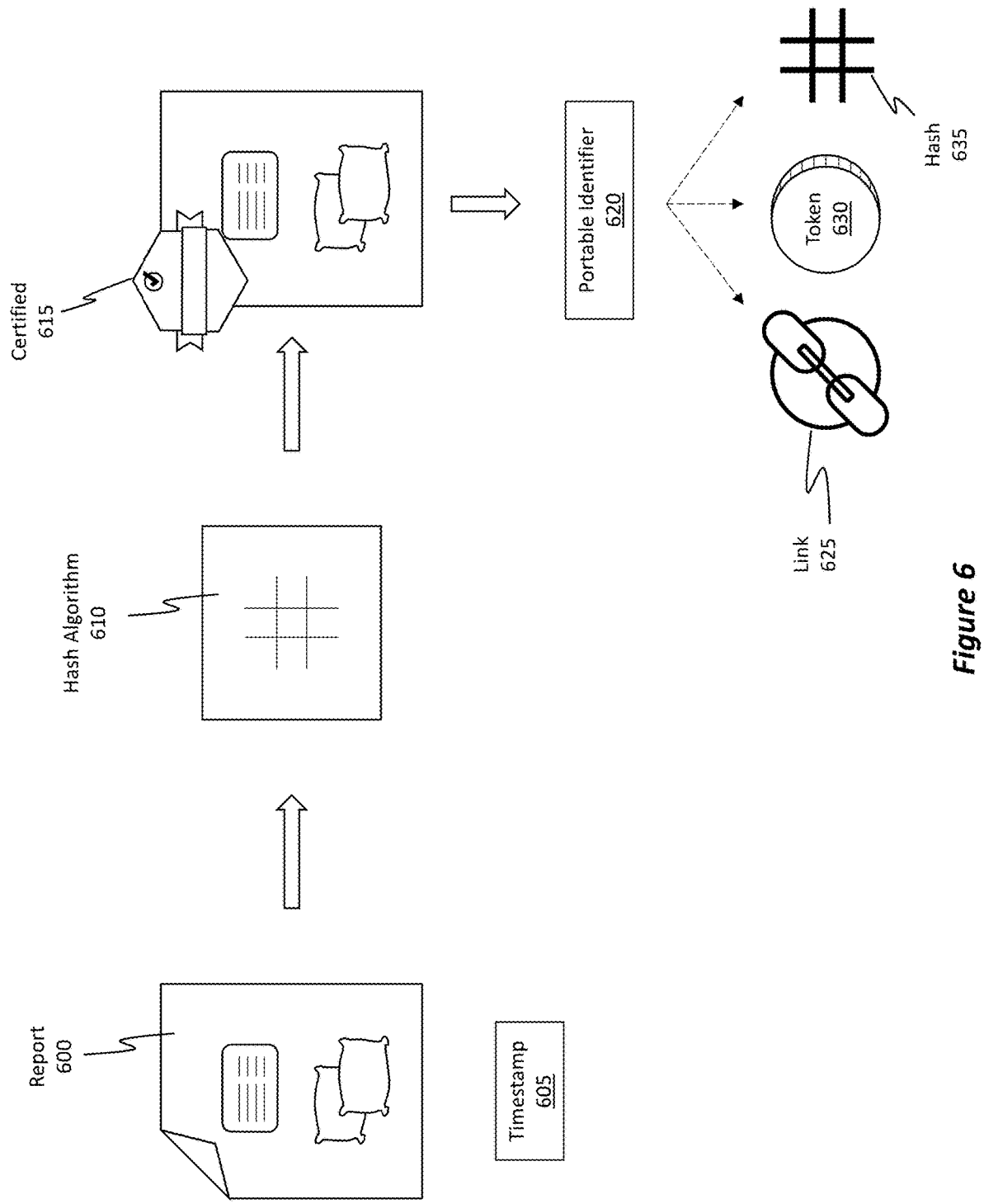
FIG. 6 illustrates how a credit report can be verified and made portable in an effort to prevent, at least for a time, additional inquiries being made against the credit history.

FIG. 6 shows a report 600, which is an example of a credit report (e.g., any of the credit reports mentioned thus far). The report 600 is generated at a particular time, as designated by the timestamp 605. For instance, perhaps the timestamp 605 reflects that the report 600 was generated at time "A" relative to the timeline in FIG. 5 or perhaps the timestamp 605 reflects that the report 600 was generated at time "C" or time "E." In any event, the timestamp 605 reflects a time when the report 600 was generated.

Notably, the report 600 can be generated by a user conducting a soft inquiry into his/her own credit history. Alternatively, the report 600 can be generated by a different entity. For instance, the report 600 can be the result of a soft inquiry or even a hard inquiry conducted by an outside entity. The user whose credit history is being checked can obtain the report 600 from the outside entity. Accordingly, the report 600 may be the result of a soft inquiry or a hard inquiry, and the report 600 can be obtained either by a user checking his/her own credit history or by an outside entity that is not the user but that provided the report 600 to the user.

A hash algorithm 610 is then executed or applied against the report 600. Generally, the hash algorithm 610 is a type of algorithm or function that generates a fixed-length result (e.g., a hash value, hash code, hash, etc.) from a particular input of any given size. By applying the hash algorithm 610 to the report 600, later modifications to the report 600 will be easily detectable because the resulting hash code will be different than the original hash code. Knowledge that a hash code has been generated for the report 600 will disincentivize modification to the report 600 because the modification is easily detectable. In some cases, the hash algorithm 610 is applied to the report 600 prior to the report 600 being accessed by any user or untrusted system. By applying the hash algorithm 610 before the report 600 is accessed by a user or untrusted system, there is an added level of assurance that the report 600 is not maliciously modified.

Accordingly, applying the hash algorithm 610 produces a hash code that can be used to determine the authenticity of the report 600 such that the hash code can be used to certify the report 600, as shown by certified 615. Furthermore, applying the hash algorithm 610 to the report 600 results in the generation of a portable identifier 620.

As shown, the portable identifier 620 may take various different forms. In some cases, the portable identifier 620 is in the form of a link 625 (e.g., perhaps a hyperlink). In some cases, the portable identifier 620 is in the form of a token 630. In some cases, the portable identifier 620 is in the form of a hash 635. That is, in some embodiments, the portable identifier is one of: a link to the certified document, a token used to access the certified document, or a hash of the certified document. Regardless of its form, the portable identifier 620 is a portable or migratable unit of data that a user can present to lenders in order to certify the state or status of his/her report 600. The portable identifier 620 can be used to access the report 600, which may be stored in a cloud data server or some other data repository.

By way of additional clarification, a user can execute a soft inquiry against his/her own credit history. This soft inquiry was result in the generation of a credit report that was generated at a particular time. In other words, the report 600 is generated at the time reflected by the timestamp 605. When performing research on which lender to use, the user may want to avoid potential lenders executing their own inquiries against the user's credit history because those inquiries may trigger a hard inquiry which may negatively impact the user's credit score (thereby potentially adversely impacting lending rates because of a lower credit score). Therefore, the user may desire to present his/her own credit report to a lender, where the credit report was generated based on a soft inquiry, which did not impact the user's credit score.

On the other hand, however, lenders may distrust the report provided by the borrower if there were not a way to certify its results. The disclosed embodiments, therefore, are designed to provide the trust needed by the lenders until such time as a hard inquiry can actually be performed. That is, by executing the hash algorithm 610, by making a certified 615 version of the report 600, and by generating the portable identifier 620 (which may be used to access and/or verify the certification of the report 600), users can present this portable identifier 620 to potential borrowers. The borrowers can then use the portable identifier 620 to access the report 600 and to see its state at the time reflected by the timestamp 605. Because the report 600 is certified and has not been modified, the borrower can make a preliminary judgment or determination regarding the user's creditworthiness based on the state of the report 600 as it existed at the time of the timestamp 605.

Figure 7:
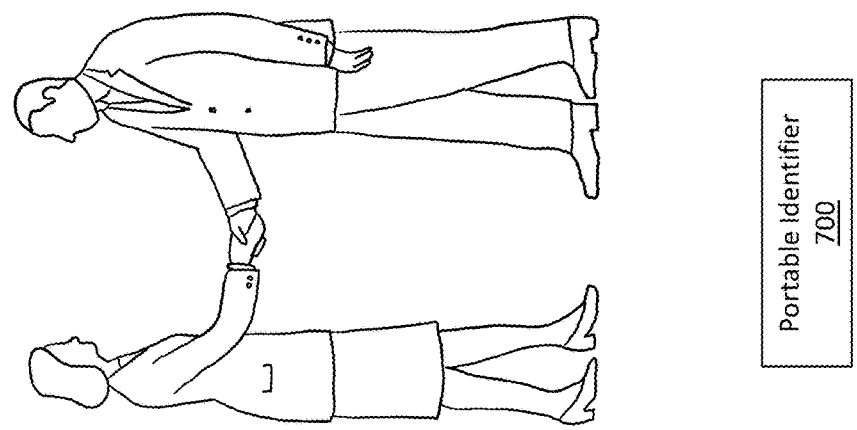
FIG. 7 illustrates how the portable and certified report can be provided or accessed during periods of negotiation with potential lenders.

That is, as shown in FIG. 7, a borrower can present his/her portable identifier 700 to a potential lender in order to spur or trigger initial negotiations regarding opening a new line of credit. The borrower can present this portable identifier 700, which provides access to a certified version of his/her credit report, to any number of potential lenders over any period of time. Because the certified version of the report represents a snapshot of the user's credit history, access events to the report will not modify the user's credit history and will not modify the user's credit score. That is, the certified report is now separate and distinct from the user's credit history, yet it provides an accurate and true snapshot of the user's credit history at a particular point in time. In this regard, the certified report can be accessed any number of times without adversely impacting the user's credit score. Therefore, instead of being limited to a particular time period controlled by when a first/initial hard inquiry is executed (e.g., once a single hard inquiry occurs, borrowers are often pressured or rushed to ensure all subsequent hard inquiries are conducted within a particular time period so as to not further reduce their credit scores), borrowers can use a prolonged period of time to research and find potential lenders.

Adding the Portable Identifier to a Blockchain

Figure 8:
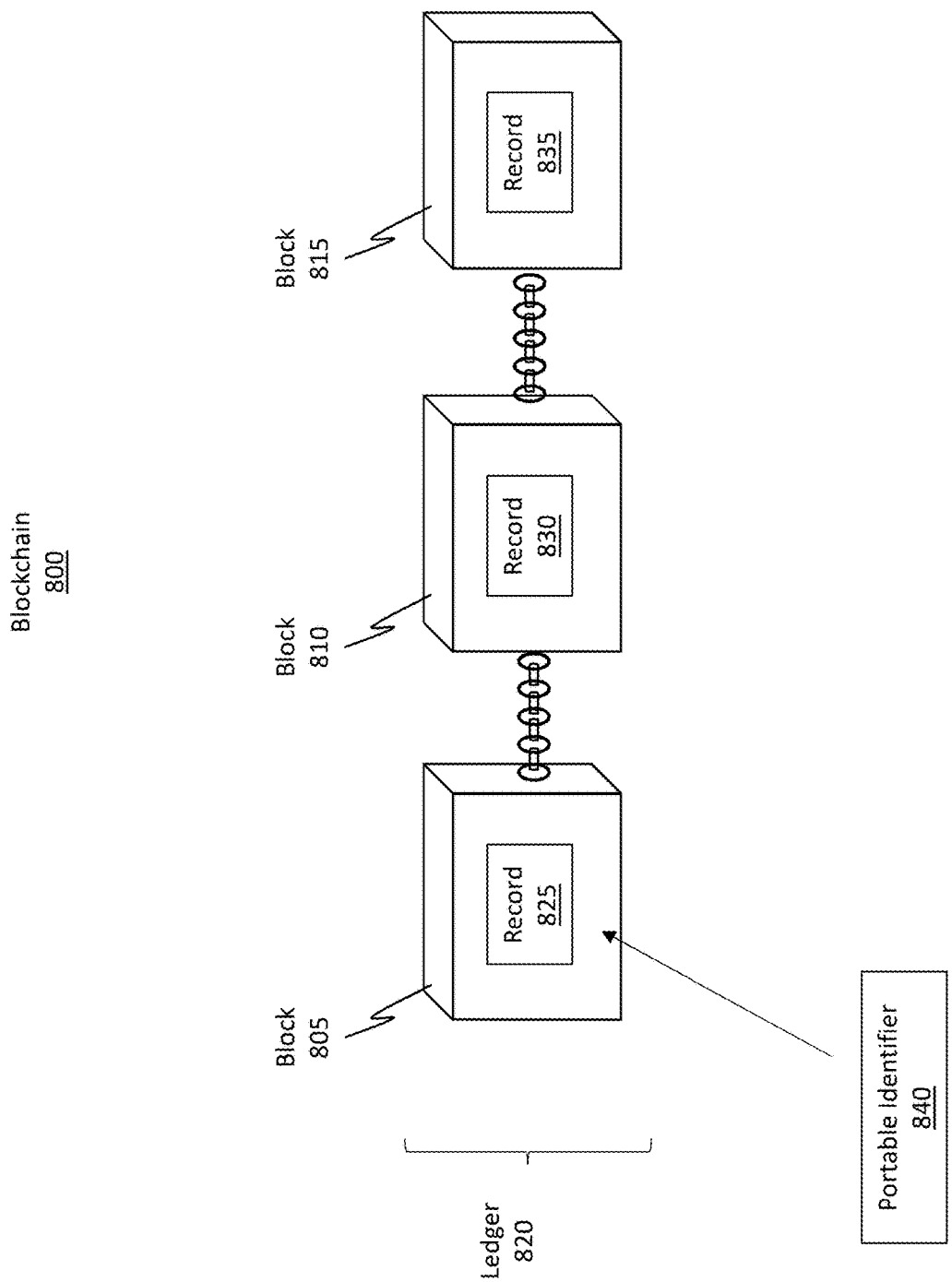
FIG. 8 illustrates how a portable identifier, which is associated with a credit report, can be included in a blockchain.

In an effort to improve the security of a portable identifier, some embodiments add the portable identifier as a record in a blockchain. FIG. 8 is illustrative.

FIG. 8 shows an example of a blockchain 800, which includes any number of blocks, such as block 805, block 810, and block 815. The combination of blocks is sometimes referred to as a ledger 820.

Each block includes one or more records. For instance, block 805 includes record 825; block 810 includes record 830; and block 815 includes record 835. The records and blocks are distributed among any number of users. Further details are provided below.

Generally, a blockchain can be considered as a type of distributed database. The blockchain 800 differs from traditional databases in that the blockchain 800 stores data in the form of blocks that are distributed and that are chained together. As a new record is received and entered, a new block is generated, and that block is then chained or linked to the other existing blocks to form a chronological ordering of blocks.

Generally, each block includes a cryptographic hash of the previous block that it is linked or chained to. The block also includes a timestamp and its transaction data. The blockchain data structure is highly resistant to alteration or manipulation because it essentially cannot be retroactively altered because of all the linkages. In other words, in order for a record to be modified, all records that are distributed across all of the users in the network would also have to be modified. Such a feat is near impossible and thus the blockchain data structure provides a highly secure and robust platform for maintaining data integrity.

In accordance with the disclosed principles, the embodiments are able to store the portable identifier (e.g., portable identifier 84) as a record in a block of the blockchain 800. For example, the portable identifier 840 is shown as being a part of the record 825 of block 805. That block is then linked to any number of other blocks in the ledger 820. Additionally, the ledger 820 can be distributed among all of the users in the blockchain network; meaning a large number of copies of the ledger 820 are distributed among a large number of users. In doing so, the integrity of the portable identifier 840 is secured using the blockchain data structure. An example will now be helpful.

Figure 9:
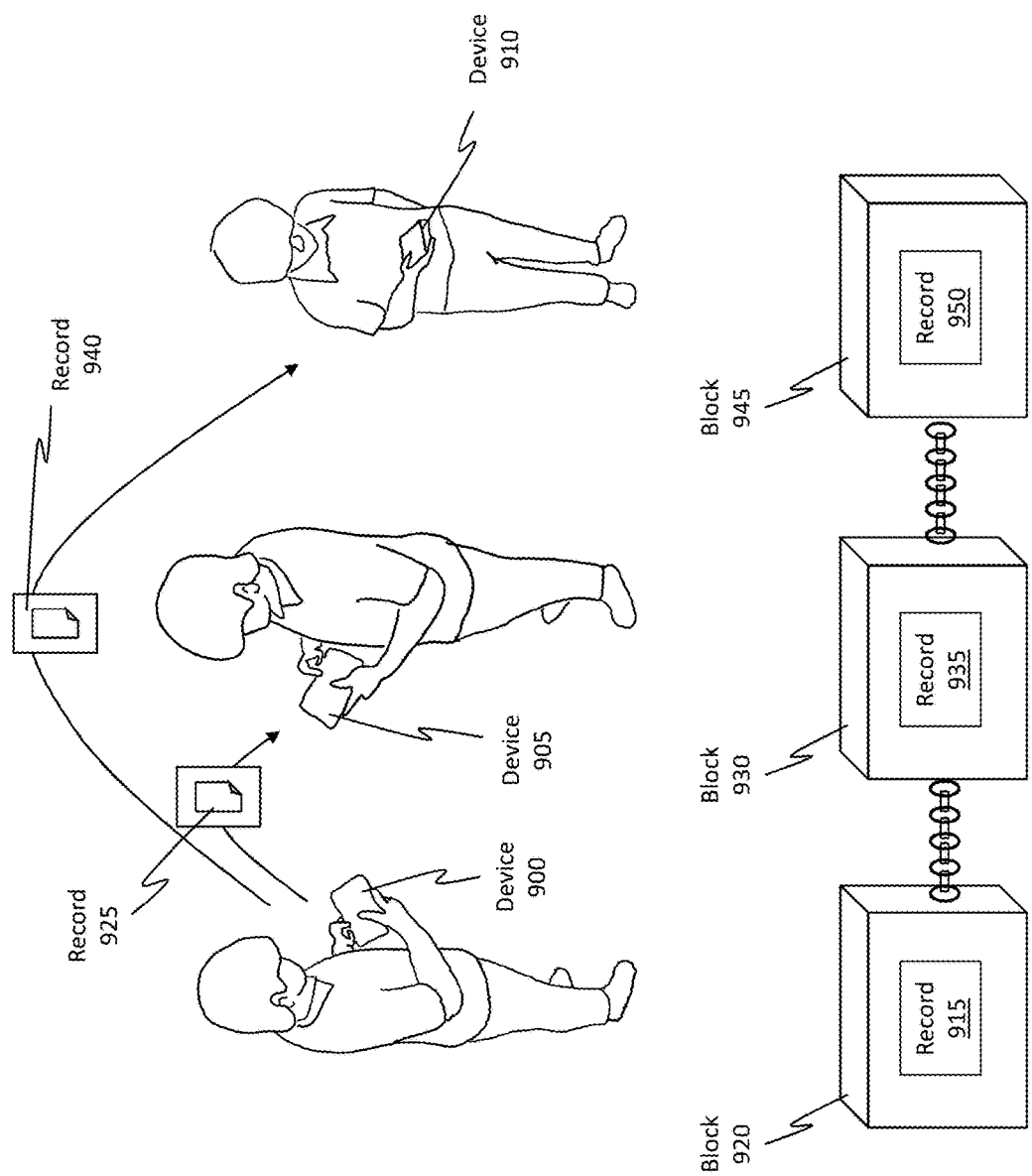
FIG. 9 illustrates how the blockchain securely records use of the portable identifier.

With reference to FIG. 9, suppose a potential borrower is shopping around to find the best rates to secure a new line of credit. The borrower is using device 900 and has an account thereon. During the research phase, the potential borrower is desirous to learn of the rates that two lenders (or any number of lenders) can provide. One lender is using device 905, and the other lender is using device 910.

Initially, the borrower's portable identifier has been stored in a record 915 of a block 920. During the conversation with the first potential lender, the lender would like to know the details of the borrower's credit report. In response, the borrower sends a record 925 to the first lender's device 905, where the record includes the portable identifier used to access the report or perhaps even includes the certified version of the borrower's credit report. A new block 930 with the record 935 of this transaction is created and added to the blockchain. The block 930 is chained to the block 920.

Similarly, during the conversation with the second potential lender, the second lender would also like to know the details of the borrower's credit report. Here, the borrower also sends a record 940 to the second lender's device 910, where the record includes the certified version of the borrower's credit report or includes the portable identifier used to access the certified version of the report. A new block 945 with the record 950 of this transaction is created and added to the blockchain. The block 945 is chained to the block 930.

Figure 10:
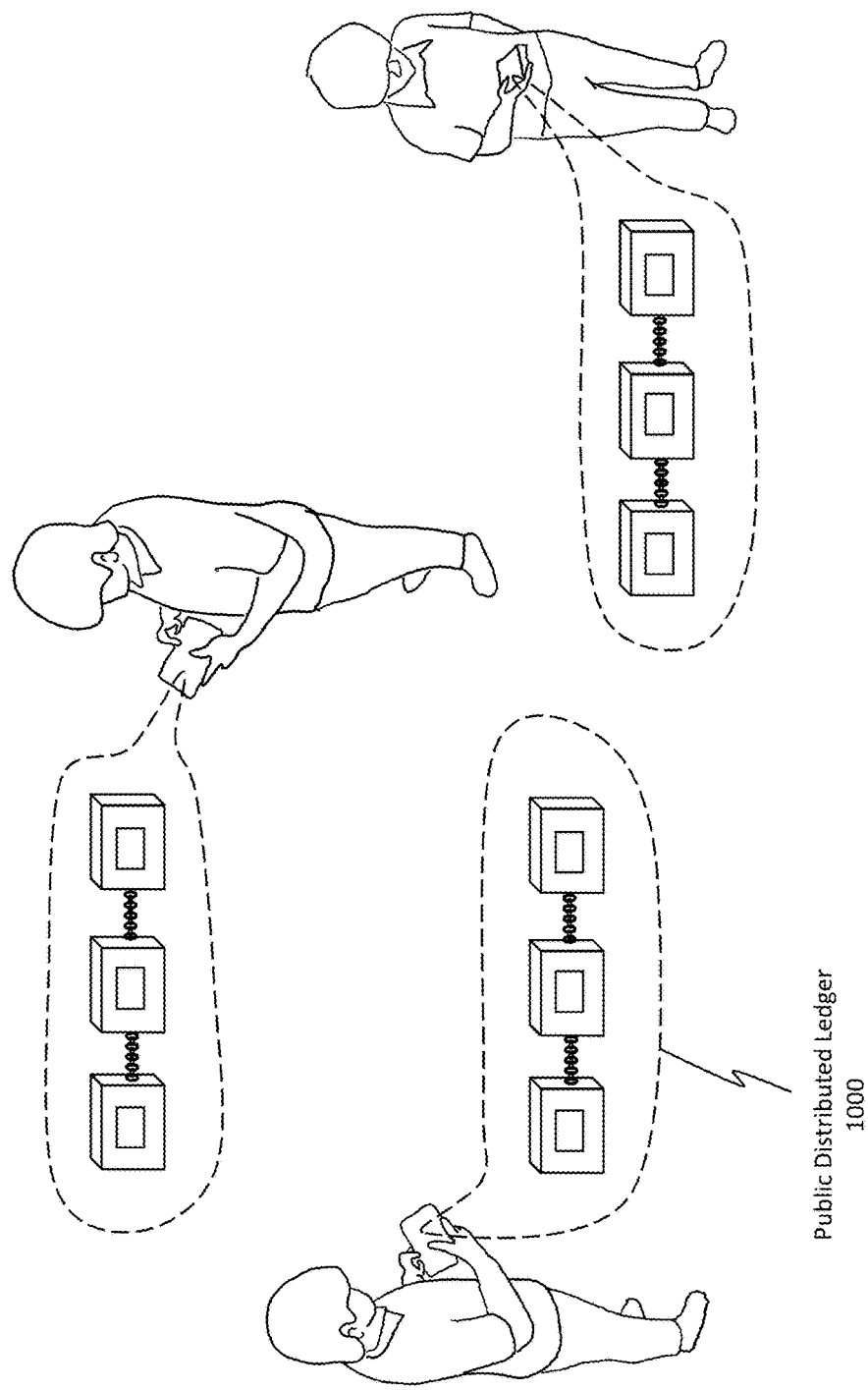
FIG. 10 provides another illustration regarding the use of the blockchain.

The ledger comprising block 920, block 930, and block 945 is then distributed among the devices 900, 905, and 910. For instance, FIG. 10 shows how the ledger, which can be referred to as a public distributed ledger 1000, is shared among the three different users. In this regard, the blockchain methodology can be used to distribute the user's portable identifier to any number of potential lenders. Accordingly, the public distributed ledger 1000 can be distributed among a plurality of devices connected to the blockchain network.

Figure 11:
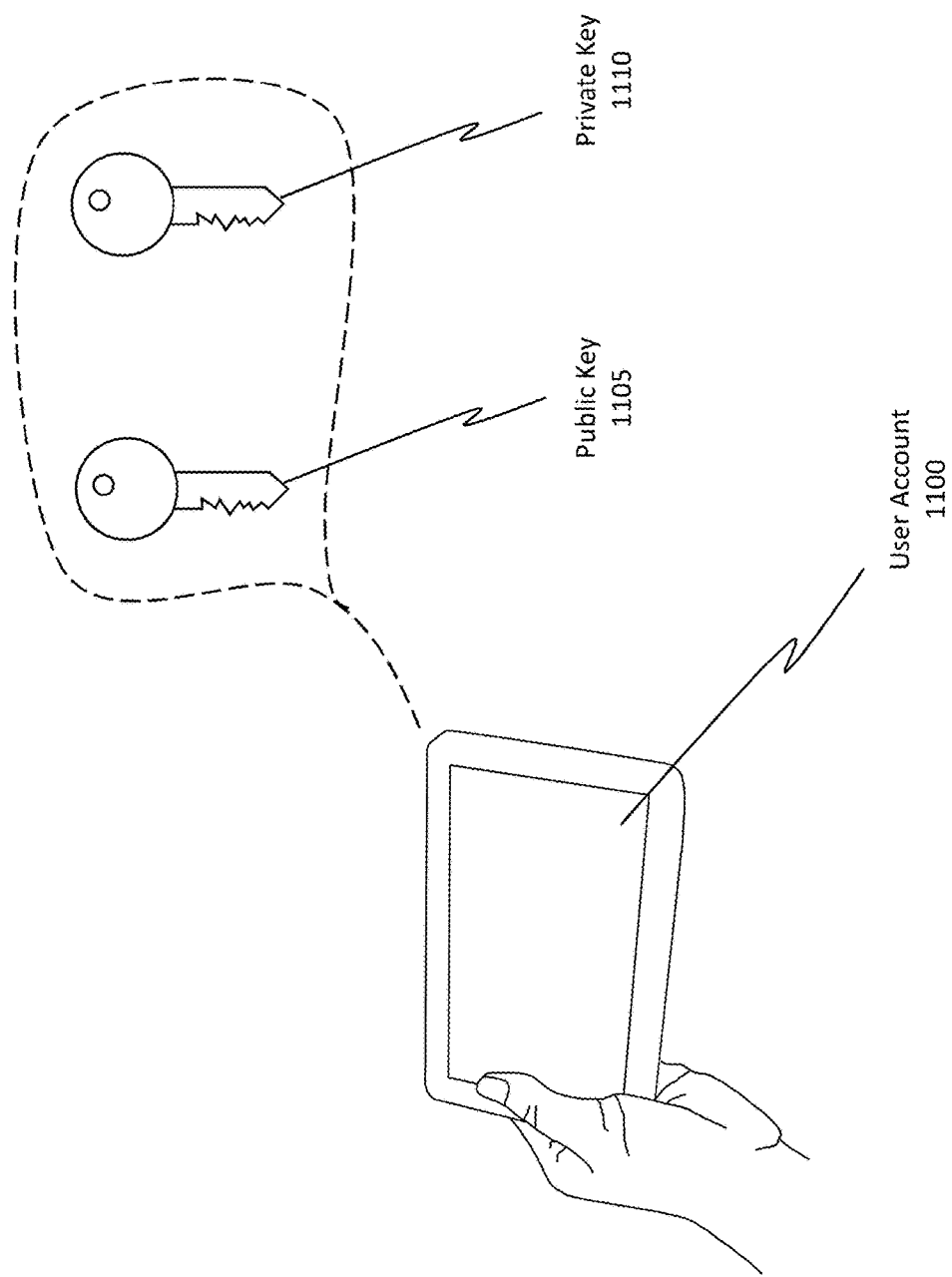
FIG. 11 illustrates how each user of the blockchain is provided with a public key and a private key.

In order to facilitate the secure transfer of the borrower's portable identifier, every user (e.g., the lenders and the borrower) are provided with a set of keys, where the set includes a private key and a public key. FIG. 11 shows how a user account 1100 is associated with both a public key 1105 and a private key 1110. Generally, the public key 1105 is known or can be known by all users in the blockchain network. An example of a public key 1105 can be a user's email address. In this regard, the public key 1105 of a user account can be an address that is available to all members of the blockchain network.

The private key 1110 is a unique piece of data or address that is kept secret by the user. An example of a private key 1110 can be a password or other secret identifier. Accordingly, the private key 1110 of a user account can be a unique address that is known only to the user of that user account.

Figure 12:
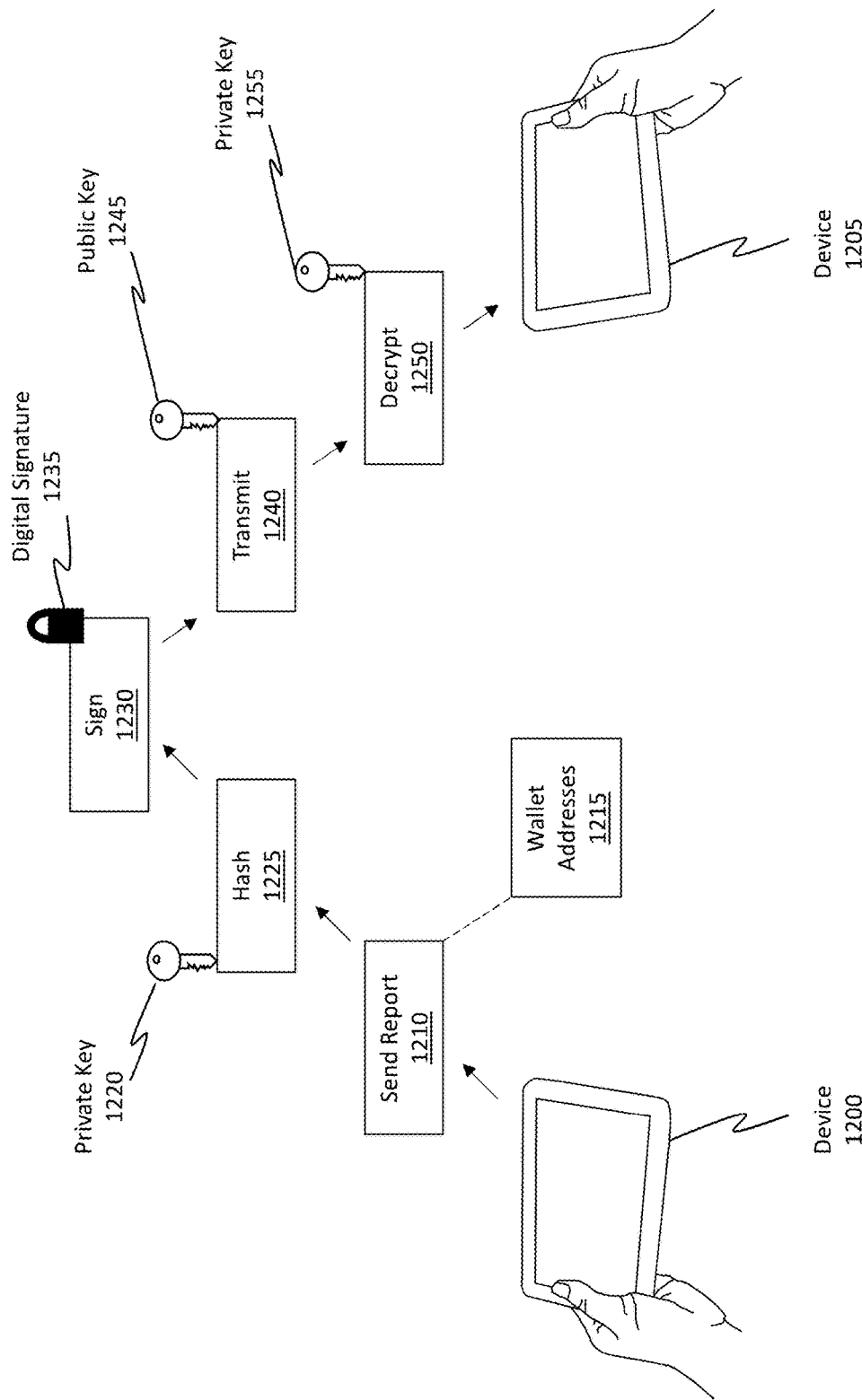
FIG. 12 illustrates how the public and private keys are used to securely transmit or send the portable identifier across the network of the blockchain.

FIG. 12 illustrates a process by which a user (e.g., a borrower) can transmit his/her portable identifier to another user (e.g., a lender) so that portable identifier can be used to access the certified report. In some cases, the certified report can be included in a record and can be transmitted in this same manner. Therefore, at least one of the portable identifier or the certified report can be included in the blockchain and can be transmitted using the process described in FIG. 12. Initially, FIG. 12 shows two devices (e.g., device 1200 and device 1205). Device 1200 belongs to a borrower and device 1205 belongs to a potential lender.

To initiate the process of sending access to the certified credit report (or sending the report itself), as shown by send report 1210, a package is created that includes the record of the user's portable identifier (or of the report itself). This package includes the wallet addresses 1215 of the user account for device 1200 and the user account for device 1205. Generally, a wallet address is a string of random letters and/or numbers that act as a username for a user. In this sense, the wallet address is a type of secured identifier. It should be noted that the wallet address is typically a hashed version of a user's public key.

The private key 1220 of the user account for device 1200 is then used to hash 1225 (e.g., apply a hashing algorithm) the package. Hashing the package operates to securely encrypt the package, including the portable identifier. Different hashing algorithms, such as (but not limited to) SHA256 and Ethash, can be used as the hashing algorithm. As a consequence of encrypting the package using the user's private key 1220, the package is now considered to have been digitally signed (e.g., sign 1230 as also shown by digital signature 1235) by the borrower.

The package can now be transmitted (e.g., transmit 1240) to the user account on device 1205 using the public key 1245 of the potential lender, or rather, using the wallet address of the lender. With the package being encrypted and sent to the lender's account, the package can be decrypted (e.g., decrypt 1250) using only the private key 1255 of the potential lender. No other users or user keys can decrypt the package. In this regard, the portable identifier can be securely transmitted from a borrower to a potential lender using the blockchain platform.

Figure 13:
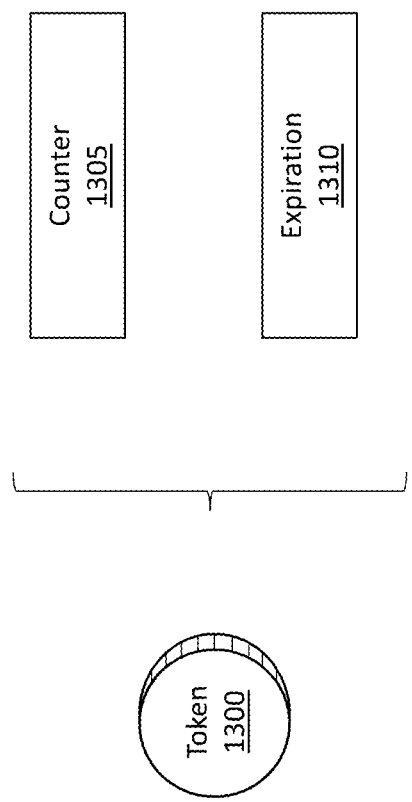
FIG. 13 illustrates how the portable identifier may be in the form of a token having particular characteristics.

In some cases, as described previously, the portable identifier may take the form of a token, such as token 1300 illustrated in FIG. 13. Optionally, that token 1300 can be associated with a counter 1305 and/or an expiration 1310.

The counter 1305 can be used to designate a number of times the token 1300 can be shared with other users, or rather, other potential lenders. By way of example, the counter 1305 may be set to a value of 10, meaning that the portable identifier can be shared 10 times before it expires and can no longer be shared. The counter 1305 can be an incremental counter or a decremental counter.

Similarly, the expiration 1310 can set a time-based lifespan for the token 1300. For instance, the expiration can be set to a particular time and date when the token 1300 will expire. Alternatively, the expiration 1310 can be set to a particular length of time subsequent to the creation of the token 1300. For example, the expiration 1310 can delineate that the token 1300 will expire a particular number of seconds, minutes, hours, or days after its creation. Combinations of the counter 1305 and the expiration 1310 can also be used. For instance, the token 1300 can be used "x" number of times or for a period of "y" time, or whichever event occurs first or last.

Accordingly, the disclosed embodiments are able to generate a secured or certified version of a user's credit report. A portable identifier (e.g., a link, token, hash, etc.) can then be generated and can be used to access the certified version of the report. This portable identifier can be stored in a blockchain and can be transmitted to potential lenders using the blockchain platform.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 14A:
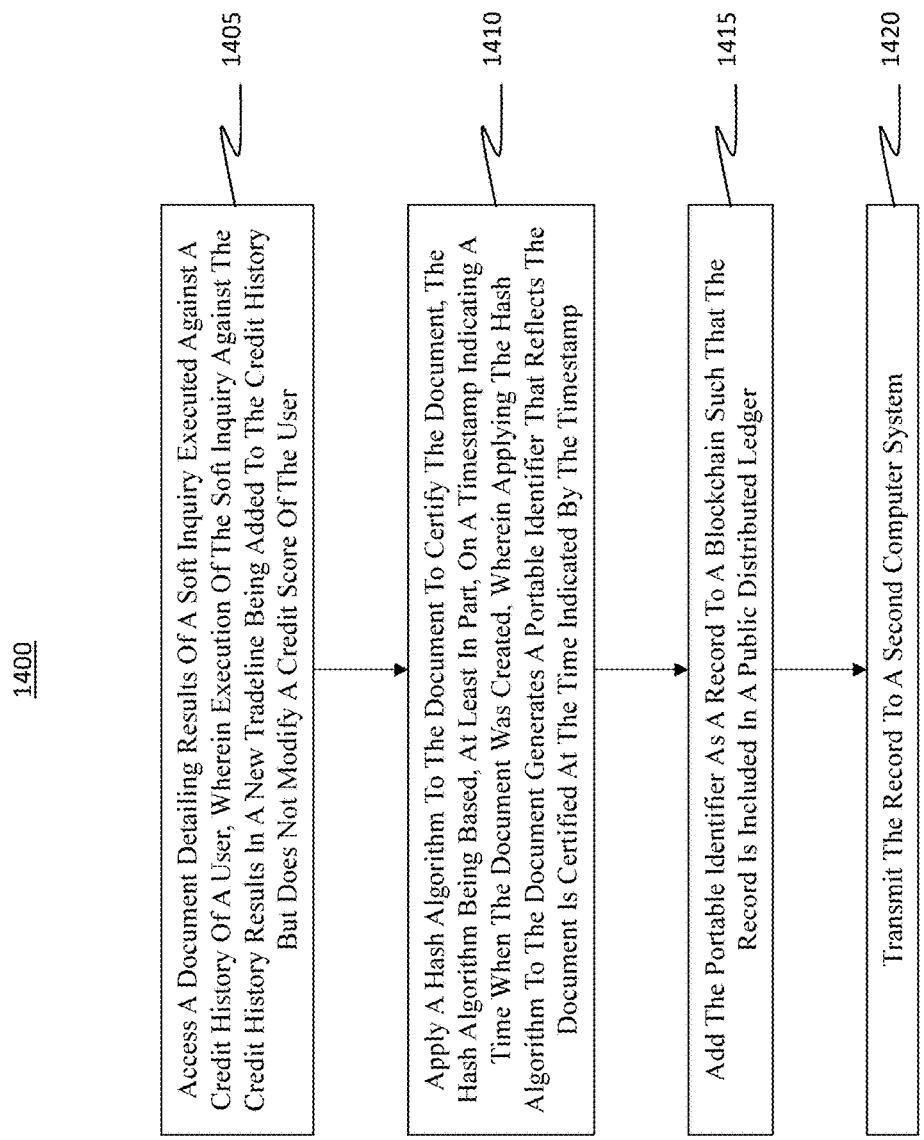
FIGS. 14A and 14B illustrate a flowchart of an example method (from the perspective of a transmitting user) for certifying a document and for securely transmitting access to the document across a blockchain network.
Figure 14B:
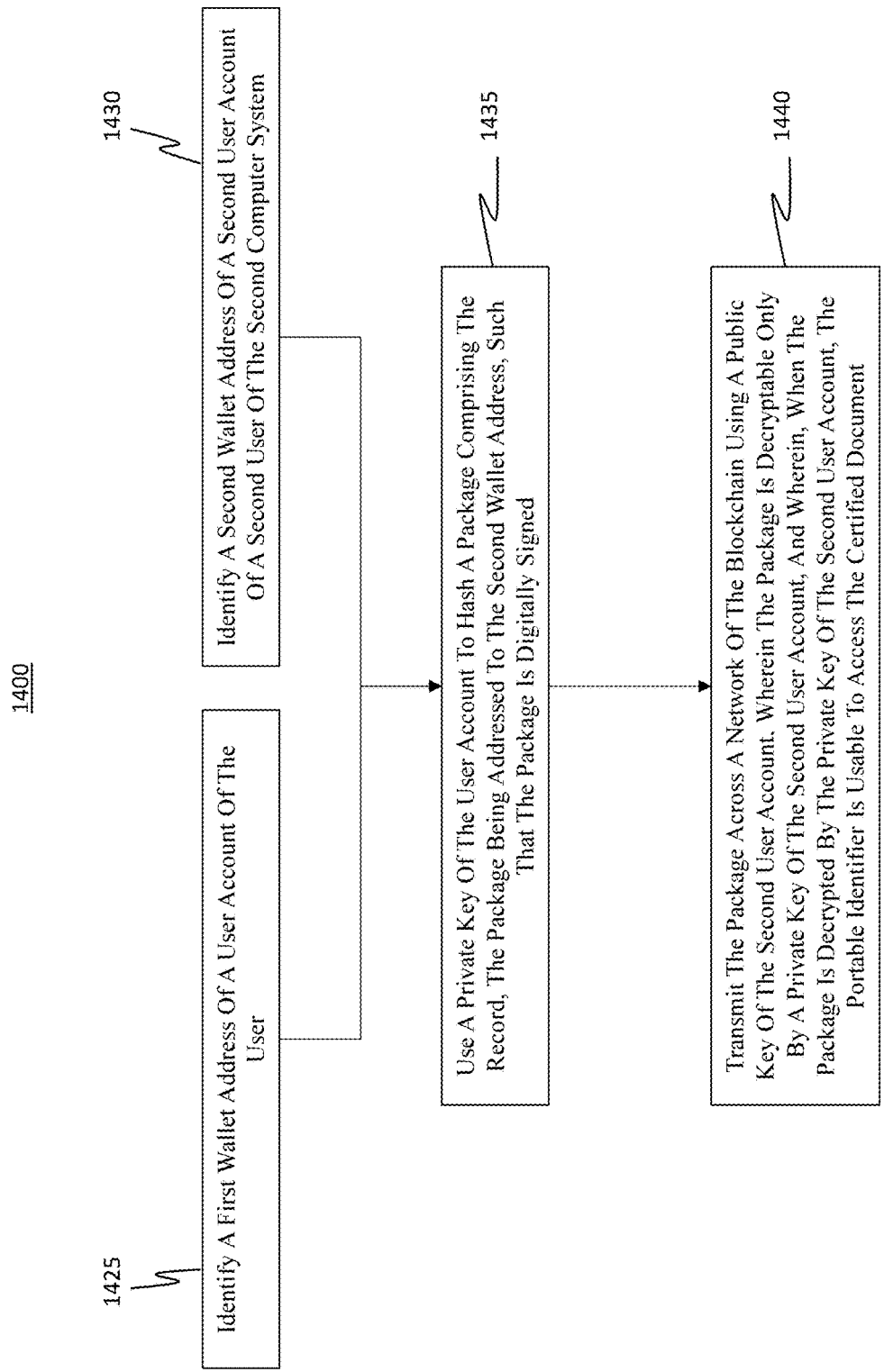

Attention will now be direct to FIGS. 14A and 14B, which illustrate a flowchart of an example method 1400 for certifying a document and for securely transmitting access to the document across a blockchain network. Initially, method 1400 includes an act (act 1405) of accessing a document detailing results of an inquiry (e.g., a soft inquiry or a hard inquiry) executed against a credit history of a user. Execution of a soft inquiry against the credit history results in a new tradeline being added to the credit history but does not modify a credit score of the user. A hard inquiry executed against the credit history of the user, on the other hand, results in another new tradeline being added to the credit history and does modify the credit score of the user.

A hash algorithm is then applied (act 1410) to the document to certify the document. Notably, the hash algorithm is based, at least in part, on a timestamp indicating a time when the document was created. Additionally, the process of applying the hash algorithm to the document generates a portable identifier that reflects the document is certified at the time indicated by the timestamp. In some implementations, the portable identifier is associated with a counter that increment or decrements each time the portable identifier is used to access the certified document. When the counter reaches a particular value (e.g., a value of 0 or some other defined value), then the portable identifier may expire and prevent further access to the certified document. In some cases, the portable identifier provides a one-time access to the certified document.

In some implementations, the portable identifier is associated with a lifespan that, when expired, results in the portable identifier no longer being usable to access the certified document. Optionally, during the lifespan, the portable identifier can be configured to permit an unlimited or perhaps a limited number of accesses to the certified document. Accordingly, in some embodiments, the portable identifier is associated with one of: (i) a counter that increment or decrements each time the portable identifier is used to access the certified document or (ii) a lifespan during which the portable identifier is active and available for use to access the certified document.

Act 1415 involves adding the portable identifier as a record to a blockchain. As a consequence, the record is included in a public distributed ledger.

Act 1420 then involves transmitting the record to a second computer system. This transmitting process may actually involve multiple different operations, which are illustrated in FIG. 14B.

For example, act 1425 includes identifying a first wallet address of a user account of the user. In parallel or in serial (e.g., before or after) act 1425, act 1430 involves identifying a second wallet address of a second user account of a second user of the second computer system. Wallet addresses are often hashed versions of a user's public key.

A private key of the user account is used (act 1435) to hash a package comprising the record. The package is addressed to the second wallet address. As a result of hashing the package, the package is now digitally signed.

Act 1440 includes transmitting the package across a network of the blockchain using a public key of the second user account, or rather, using the wallet address. Notably, the package is decryptable only by a private key of the second user account. Furthermore, when the package is decrypted by the private key of the second user account, the portable identifier is usable to access the certified document. Optionally, after the package is transmitted across the network and after the package is decrypted, the embodiments trigger or detect execution of a hard inquiry against the credit history of the user. For instance, the hard inquiry can be automatically executed or, alternatively, a notice can be provided to the lender where the notice informs the lender how to trigger the hard inquiry. The hard inquiry, which is executed against the borrower's credit history, results in another new tradeline being added to the credit history and does modify the borrower's credit score.

Figure 15:
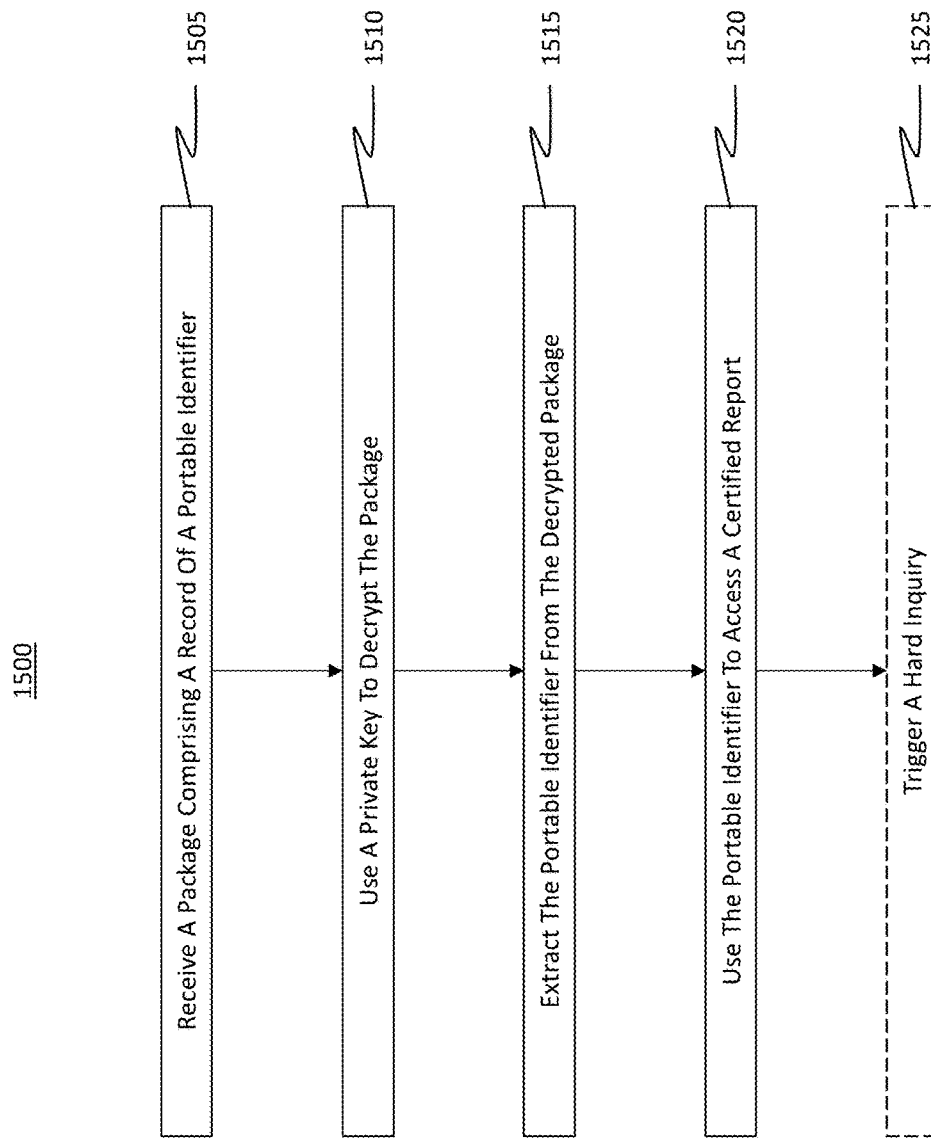
FIG. 15 illustrates a flowchart of an example method (from the perspective of a receiving user) for certifying a document and for securely receiving access to the document across the blockchain network.

Method 1400 is generally from the perspective of the borrower. In contrast, method 1500 of FIG. 15 is from the perspective of a potential lender.

In particular, method 1500 includes an act (act 1505) of receiving a package from a potential borrower, where the package is optionally transmitted using the blockchain network. The package includes a record of a portable identifier.

Act 1510 involves using a private key to decrypt the package. Act 1515 then involves extracting the portable identifier from the decrypted package.

With the portable identifier now available, act 1520 includes using the portable identifier to access a certified report, such as the certified credit reports mentioned earlier. In some cases, the portable identifier is a link, a token, or a hash. Regardless of its form, the portable identifier can be used to access the certified report, which may be stored in a cloud server or some other accessible data repository. In some cases, the portable identifier can be used not only to access the certified report but also to check the certification or the authenticity of the report. For instance, if the portable identifier is or includes a hash code, a new hash of the report can be performed and the resulting hash code can be compared against the hash code of the portable identifier to determine if the two hashes are the same. If they are the same, then the report is authentic and has not been modified.

As an optional process, method 1500 may include act 1525 (shown in dotted box form to indicate its optional status) of triggering a hard inquiry in order to facilitate the process of actually opening a new line of credit or a new loan with the borrower. That is, now that the lender has reviewed the initial certified credit report and determined the borrower is at least tentatively creditworthy, the lender can now actually run a hard inquiry. Notably, the borrower and the lender have come to terms regarding borrowing rates, and the borrower has decided he/she would like to work with this particular lender. Consequently, only this single lender will then conduct a hard inquiry as opposed to potentially multiple different lenders performing multiple hard inquiries. In this sense, the disclosed embodiments help spur and motivate preliminary negotiations so that potential lenders can make an initial judgment regarding the creditworthiness of a borrower without having to conduct a hard inquiry against the borrower's credit history.

Figure 16:
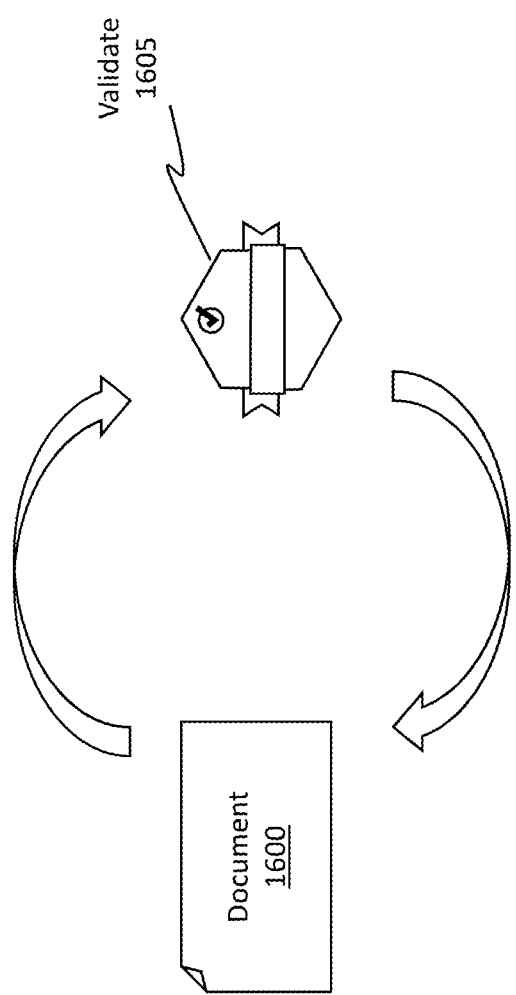
FIG. 16 illustrates how a document can be validated without modifying metadata or properties of the document itself.

Generally, the embodiments provide techniques for verifying the validity of a document, where that verification can occur without modifying the document. FIG. 16 is illustrative.

FIG. 16 shows a document 1600, which is representative of the certified reports mentioned thus far. This document 1600 is a data file that was generated in response to a borrower triggering his/her own soft inquiry into his/her own credit history or, perhaps, it was generated by an outside entity that conducted a hard or soft inquiry. The inquiry (hard or soft) generates a credit report, which is what the document 1600 represents. In accordance with the disclosed principles, the embodiments certify the document 1600 in the manner discussed previously.

With the document 1600 now certified, a portable identifier is created, where the portable identifier can be used to access the document 1600. The portable identifier can be transmitted to other users or interested parties (e.g., lenders) using the blockchain network.

When a lender receives the portable identifier, the lender can use the portable identifier to view and/or access the document 1600 in order to validate 1605 its authenticity and to make an initial determination regarding the borrower's creditworthiness. Notably, accessing the document 1600 does not result in new tradelines being added to the borrower's credit report or credit history. Furthermore, access events also do not modify the document 1600. Such is the case because the document 1600 is a snapshot of what the borrower's credit history looked like at a particular time reflected by a timestamp. Accessing the document 1600, therefore, does not impact the borrower's credit history, credit report, or credit score. Potential lenders are highly benefitted, however, because they are able to view the borrower's credit report as it existed at the time the document 1600 was created. The lenders and borrower can use the document 1600 to facilitate preliminary discussions and to determine whether to proceed with running a final hard inquiry in order to trigger opening a new line of credit.

In some cases, the disclosed embodiments can be used in a reverse shopping or reverse marketplace scenario. For instance, suppose a user is shopping for a loan (e.g., a mortgage) from a potential lender. With the disclosed principles, the user can provide his/her credit score and history in the manner described previously. Potential lenders can view that information and can then attempt to underbid other lenders in order to acquire the user's business by taking out a loan. Instead of interacting with only a handful of potential lenders, users can now be exposed to almost an unlimited number of potential lenders.

In some cases, the disclosed embodiments can rely on a nonfungible token (NFT), which can be included in the blockchain. That is, the tokens mentioned herein can be implemented in the form of an NFT, which is a token that is wholly unique and independent relative to other tokens.

Example Computer/Computer Systems

Figure 17:
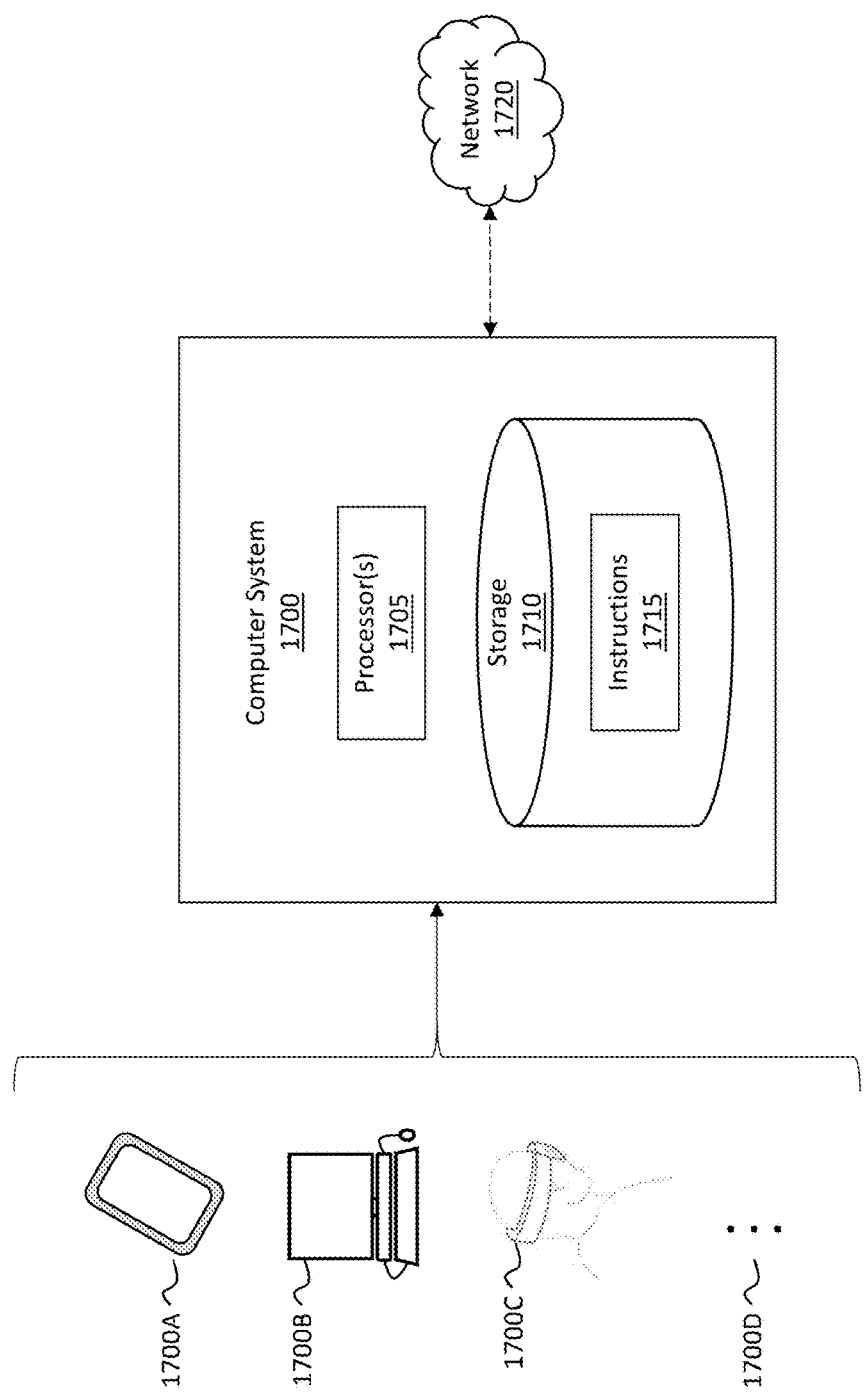
FIG. 17 illustrates an example computer system configured to perform any of the disclosed operations.

Attention will now be directed to FIG. 17 which illustrates an example computer system 1700 that may include and/or be used to perform any of the operations described herein. Computer system 1700 may take various different forms. For example, computer system 1700 may be embodied as a tablet 1700A, a desktop or a laptop 1700B, a wearable device 1700C, a mobile device, or any other type of stand-alone computing device. The ellipsis 1700D demonstrates how any other computing device may be used. Computer system 1700 may also be a distributed system that includes one or more connected computing components/devices that are in communication with computer system 1700.

In its most basic configuration, computer system 1700 includes various different components. FIG. 17 shows that computer system 1700 includes one or more processor(s) 1705 (aka a "hardware processing unit") and storage 1710.

Regarding the processor(s) 1705, it will be appreciated that the functionality described herein can be performed, at least in part, by one or more hardware logic components (e.g., the processor(s) 1705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1700. The different components, modules, engines, and services described herein may be implemented as objects or processors that execute on computer system 1700 (e.g. as separate threads).

Storage 1710 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage 1710 is shown as including executable instructions 1715. The executable instructions 1715 represent instructions that are executable by the processor(s) 1705 of computer system 1700 to perform the disclosed operations, such as those described in the various methods.

The disclosed embodiments may comprise or utilize a special-purpose or general-purpose computer including computer hardware, such as, for example, one or more processors (such as processor(s) 1705) and system memory (such as storage 1710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1720. For example, computer system 1700 can communicate with any number devices or cloud services to obtain or process data. In some cases, network 1720 may itself be a cloud network. Furthermore, computer system 1700 may also be connected through one or more wired or wireless networks 1720 to remote/separate computer systems(s) that are configured to perform any of the processing described with regard to computer system 1700.

A "network," like network 1720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to certify a document and to securely transmit access to the document across a network of a public distributed ledger, said computer system comprising:
   one or more processors; and
   one or more computer-readable hardware storage devices that store instructions that are executable by the one or more processors to cause the computer system to at least:
      access a document detailing results of a soft inquiry executed against a credit history of a user, wherein execution of the soft inquiry against the credit history results in a new tradeline being added to the credit history but does not modify a credit score of the user;
      apply a hash algorithm to the document to generate a hash code, which is usable to certify the document based on a timestamp indicating a time when the document was created, wherein applying the hash algorithm to the document results in generation of a portable identifier, which is usable to access the certified document and includes the hash code;
      add the portable identifier as a record to a block in a public distributed ledger such that the record is included in the block of the public distributed ledger, wherein each block in the public distributed ledger includes a cryptographic hash of its previous block;
      create a package comprising the record, a first wallet address of a user account of the user, and a second wallet address of a second user account of a second user of the second computer system; and
      transmit the package to the second computer system by performing the following:
         identifying the first wallet address of a user account of the user;

identifying the second wallet address of the second user account of the second user of the second computer system;
using a private key of the user account to hash the package such that the package is digitally signed, the package being addressed to the second wallet address; and
transmitting the package across a network of the public distributed ledger using a public key of the second user account, wherein the package is decryptable only by a private key of the second user account, and wherein, when the package is decrypted by the private key of the second user account, the portable identifier added to the record in the package is usable to access the certified document and the hash code in the portable identifier is usable to determine whether or not the certified document is authentic.

2. The computer system of claim 1, wherein a hard inquiry executed against the credit history of the user results in another new tradeline being added to the credit history and does modify the credit score of the user, and
wherein, after the package is decrypted, the portable identifier is used to access the certified document.

3. The computer system of claim 1, wherein the portable identifier is associated with a counter that decrements each time the portable identifier is used to access the certified document, and wherein when the counter reaches a value of 0, the portable identifier expires.

4. The computer system of claim 1, wherein the portable identifier provides a one-time access to the certified document.

5. The computer system of claim 1, wherein the portable identifier is associated with a lifespan that, when expired, results in the portable identifier no longer being usable to access the certified document.

6. The computer system of claim 5, wherein, during the lifespan, the portable identifier permits an unlimited number of accesses to the certified document.

7. The computer system of claim 5, wherein, during the lifespan, the portable identifier permits a limited number of accesses to the certified document.

8. The computer system of claim 1, wherein the portable identifier is one of: a link to the certified document, a token used to access the certified document, or a hash of the certified document.

9. The computer system of claim 8, wherein the portable identifier is the link to the certified document.

10. The computer system of claim 8, wherein the portable identifier is the token used to access the certified document.

11. The computer system of claim 8, wherein the portable identifier is the hash of the certified document.

12. A method for certifying a document and for securely transmitting access to the document across a network of a public distributed ledger, said method comprising:
accessing a document detailing results of a soft inquiry executed against a credit history of a user, wherein execution of the soft inquiry against the credit history results in a new tradeline being added to the credit history but does not modify a credit score of the user;
applying a hash algorithm to the document to generate a hash code, which is used to certify the document based on a timestamp indicating a time when the document was created, wherein applying the hash algorithm to the document results in generation of a portable identifier, which is useable to access the certified document and includes the hash code;
adding the portable identifier as a record to a block in a public distributed ledger such that the record is included in the block of the public distributed ledger, wherein each block in the public distributed ledger includes a cryptographic hash of its previous block;
create a package comprising the record, a first wallet address of a user account of the user, and a second wallet address of a second user account of a second user of the second computer system; and
transmitting the package to the second computer system by performing the following:
identifying the first wallet address of the user account of the user;
identifying the second wallet address of the second user account of the second user of the second computer system;
using a private key of the user account to hash the package such that the package is digitally signed, the package being addressed to the second wallet address; and
transmitting the package across a network of the public distributed ledger using a public key of the second user account, wherein the package is decryptable only by a private key of the second user account, and wherein, when the package is decrypted by the private key of the second user account, the portable identifier added to the record in the package is usable to access the certified document and to determine whether or not the certified document is authentic.

13. The method of claim 12, wherein the public key of the second user account is an address that is available to all members of the blockchain network, and wherein the private key of the second user account is a unique address that is known only to the second user account.

14. The method of claim 12, wherein the private key of the second user is a password.

15. The method of claim 12, wherein the method further includes:
after the package is transmitted across the network and after the package is decrypted, a hard inquiry is triggered for execution against the credit history of the user.

16. The method of claim 15, wherein the hard inquiry executed against the credit history of the user results in another new tradeline being added to the credit history and does modify the credit score of the user.

17. The method of claim 12, wherein the portable identifier is associated with one of: (i) a counter that decrements each time the portable identifier is used to access the certified document or (ii) a lifespan during which the portable identifier is active.

18. A computer system configured to certify a document and to securely transmit access to the document across a network of a public distributed ledger, said computer system comprising:
one or more processors; and
one or more computer-readable hardware storage devices that store instructions that are executable by the one or more processors to cause the computer system to at least:
access a document detailing results of a soft inquiry executed against a credit history of a user, wherein execution of the soft inquiry against the credit history results in a new tradeline being added to the credit history but does not modify a credit score of the user, and wherein a hard inquiry executed against the credit history of the user results in another new tradeline being added to the credit history and does modify the credit score of the user;

apply a hash algorithm to generate a hash code, which is usable to the document to certify the document based on a timestamp indicating a time when the document was created, wherein applying the hash algorithm to the document results in generation of a portable identifier, which is usable to access the certified document and includes the hash code;

add the portable identifier as a record to a blockchain such that the record is included in a public distributed ledger;

create a package comprising the record, a first wallet address of a user account of the user, and a second wallet address of a second user account of a second user of the second computer system; and transmit the record to a second computer system by performing the following:
  identifying a first wallet address of a user account of the user;
  identifying the second wallet address of the second user account of the second user of the second computer system;
  using a private key of the user account to hash the package such that the package is digitally signed, the package being addressed to the second wallet address;
  transmitting the package across a network of the public distributed ledger using a public key of the second user account, wherein the package is decryptable only by a private key of the second user account, and wherein, when the package is decrypted by the private key of the second user account, the portable identifier added to the record in the package is usable to access the certified document and the hash code in the portable identifier is usable to determine whether or not the certified document is authentic; and after the package is transmitted across the network and after the package is decrypted, trigger or detect execution of the hard inquiry against the credit history of the user.

19. The computer system of claim 18, wherein the portable identifier is one of: a link to the certified document, a token used to access the certified document, or a hash of the certified document.

20. The computer system of claim 18, wherein the public distributed ledger is distributed among a plurality of devices connected to the blockchain network.

\* \* \* \* \*